US006577596B1

(12) United States Patent
Olsson et al.

(10) Patent No.: US 6,577,596 B1
(45) Date of Patent: Jun. 10, 2003

(54) METHOD AND APPARATUS FOR PACKET DELAY REDUCTION USING SCHEDULING AND HEADER COMPRESSION

(75) Inventors: Gunnar Olsson, Tumba (SE); Simon Rahlén, Tullinge (SE)

(73) Assignee: Telefonaktiebolaget LN Ericsson (publ), Stockholm (SE)

( * ) Notice: Subject to any disclaimer, the term of this patent is extended or adjusted under 35 U.S.C. 154(b) by 0 days.

(21) Appl. No.: 09/451,081

(22) Filed: Nov. 30, 1999

(51) Int. Cl.$^7$ .............................................. H04L 12/26
(52) U.S. Cl. .................................. 370/230; 370/395.42
(58) Field of Search .................................. 370/229, 230, 370/230.1, 231, 395.4, 395.41, 395.42, 395.43, 428, 429, 412, 413, 415, 417, 468, 477

(56) References Cited

U.S. PATENT DOCUMENTS

| | | | | |
|---|---|---|---|---|
| 5,231,633 A | * | 7/1993 | Hluchyj et al. ............ | 370/429 |
| 5,293,379 A | | 3/1994 | Carr | |
| 5,978,386 A | | 11/1999 | Hämäläinen et al. | |
| 5,987,022 A | | 11/1999 | Geiger et al. | |
| 5,999,528 A | * | 12/1999 | Chow et al. ............... | 370/365 |
| 6,269,079 B1 | * | 7/2001 | Marin et al. ............... | 370/230 |
| 6,324,165 B1 | * | 11/2001 | Fan et al. .................. | 370/232 |
| 6,449,255 B1 | * | 9/2002 | Waclawsky ................ | 370/236 |

FOREIGN PATENT DOCUMENTS

WO  99/13624  3/1999

OTHER PUBLICATIONS

W. Storz and G. Beling "Transmitting time–critical data over heterogeneous subnetworks using standardized protocols", Mobile Networks and Applicatiosn 2 (1997) p.p. 243–249, document No. XP–000853528.

"Open Systems Interconnect (OSI)—New International Standards Architectures and Protocols for Distributed Information Systems", special issue, Proceedings of the IEEE, H.C. Folts and R. des Jardins, eds. , vol. 71, No. 12, Dec. 1983.
"Internet Protocol Specification", E.J. Postel, SRI International, Menlo Park, CA, Sep. 1981, RFC791.
"The Point to Point Protocol" editor W. Simpson, Networking Group Request for Comments RFC 1661, Jul. 1994.
"Cisco IOS™ Software Quality of Service Solutions", Apr. 8, 1999, by Cisco Systems.
"Multi–Class Extension to Multi–Link PPP", Carsten Borman, Internet Engineering Task Force (IETF), Dec. 1999.
"Providing Integrated Services Over Low–bitrate Links", by Carsten Borman, Jun. 1999.
"Compressing TCP/IP Headers for Low–Speed Serial Links", editor V. Jacobson, Feb. 1990.

* cited by examiner

Primary Examiner—Kwang Bin Yao

(57) ABSTRACT

A method and apparatus for reducing delay in the transmission of a plurality of packets by performing IP scheduling and header compression at various layers in a multilayer architecture having a plurality of classifications includes scheduling packets according to classifications. If congestion occurs during scheduling, packets may be discarded. Some packet headers may be compressed thereafter. Packets may further be queued in a first and a second queue, after scheduling, discarding, and compressing, according to at least two classifications. Best Efforts packets may be queued into the lower priority second queue. Classifications may be associated with, for example, QoS levels, delay factors, LFI, and Multilink PPP. Scheduling is performed at higher or lower layers in a multi-layer protocol. The lower layer includes a PPP layer. The lower layer may also include an HDLC layer which creates a tag for packets prior to compression being performed thereupon. The tag may be added to packets at some point thereafter. Tags are removed prior to transmission. An outbound packet queue having a queue depth of no greater than one ensures no more than one Best Efforts packet wait time.

23 Claims, 8 Drawing Sheets

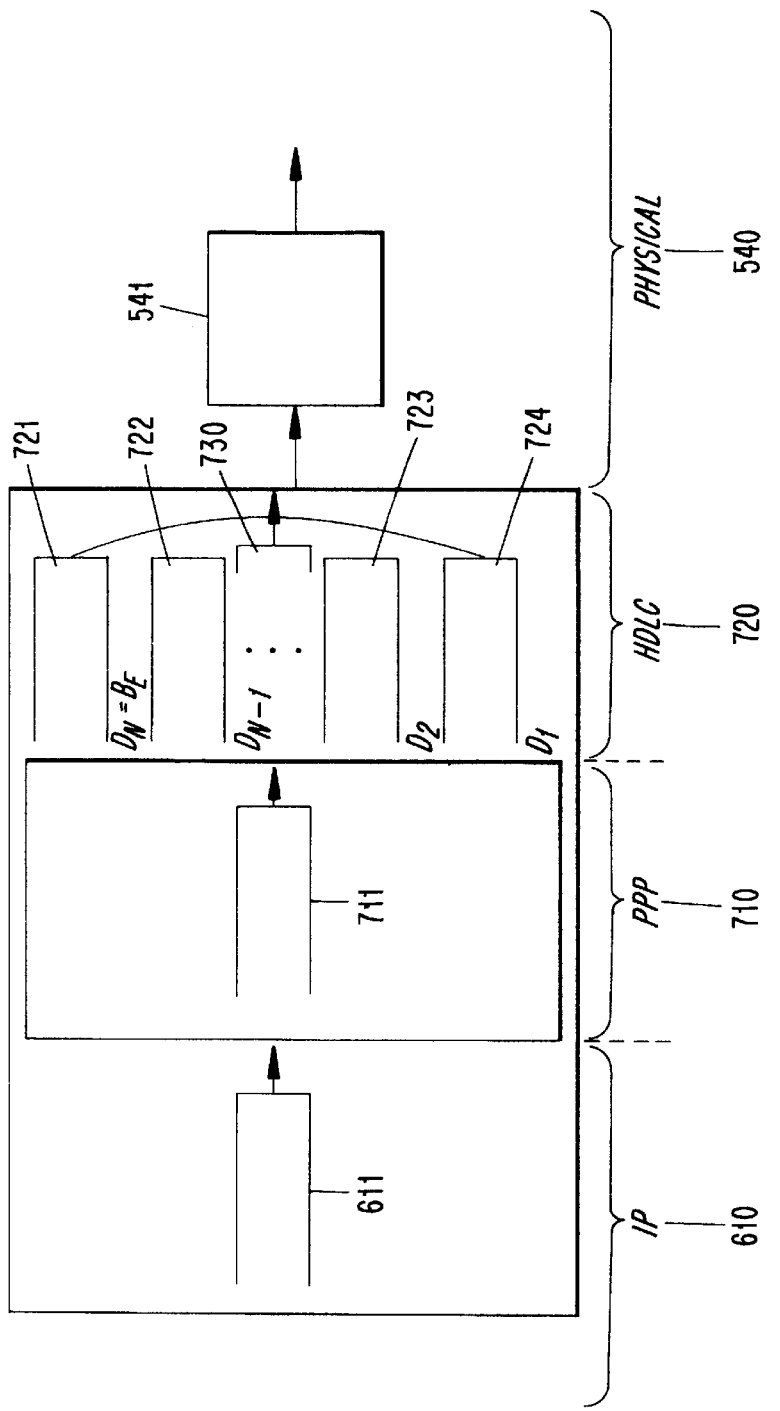

METHOD AND APPARATUS FOR PACKET DELAY REDUCTION USING SCHEDULING AND HEADER COMPRESSION

BACKGROUND

The present invention relates to multiplex communication systems for transferring information in packets and more particularly, to scheduling and header compression of packets in a multilayered network architecture.

Modern communications networks carry increasing amounts of packet traffic which is associated with real-time voice, video, and related data. The Internet, for example, is seeing many new applications which take advantage of what is a relatively less costly alternative to conventional telephone call connections for sending a variety of data including real time voice and video. Trends toward real time applications over the Internet are driven in part by increasingly powerful computers being installed in private homes and the proliferation of the Internet as a focal point for various on-line activities such as holding voice conversations, listening to music, watching video clips, and the like. Unlike Internet communications which occur between computers on high bandwidth commercial connections, bandwidth in a typical home is limited by connectivity constraints imposed by modem speed, line quality, and the like.

Further compounding the basic problem of limited bandwidth, is the limitation on the amount of actual information transmitted as a result of packet overhead due to protocol headers. Basic Internet protocols were developed primarily for making sure that packets were delivered accurately end to end at a time when little consideration was paid to real time issues.

Three layer interface architectures including protocols such as X.25, for example, were developed for controlling transfer at the lower levels while higher layer protocols were developed to control more sophisticated functions (see, "Open Systems Interconnect (OSI)—New International Standards Architectures and Protocols for Distributed Information Systems," special issue, Proceedings of the IEEE, H. C. Folts and R. des Jardins, eds., vol. 71, no. 12, December 1983). According to the design philosophy, lower layer functions were contemplated to be "transparent" to higher layer functionality and thus much of what can be accomplished at the lower layers is limited only by the ability of lower layer hardware and software to preserve that transparency. At the lowest layer, the Physical Layer, a protocol specification governs the physical connection between devices, such as, for example, the X.21 protocol. Next, the Data Link Layer specifies the protocol for, for example, accepting packets from higher layers and placing them into, for example, HDLC frames for transfer across the Physical Layer. The Data Link layer further may accept framed information from the Physical Layer and unpack it for transfer up to the Network Layer. At the Network Layer, or packet layer, multiple logical connections may be established and addresses attached to packets based on several assumptions including that successful end to end delivery is not guaranteed, that orderly delivery is not guaranteed, and that packets or "datagrams" are delivered one at a time each containing information such as destination address, and the like.

It is important to note that while various lower layers are discussed herein, datagrams from higher layers may form the input to a Network Layer process or system, which in turn provide input to successively lower layers, and eventually to the destination. Higher layer datagrams input to a Network Layer entity may be input from, for example, a Transport Layer process or system. A typical and well know transport layer protocol is the Transport Control Protocol (TCP) although other Transport Layer protocols are known and used. In particular, the User Datagram Protocol (UDP) may often be used as a Transport Layer protocol. UDP is a protocol which defines a connectionless datagram service. A Transport Layer process or system implementing UDP may produce self-contained data packets which include destination routing information.

A ubiquitous protocol for Network Layer communications over the Internet is the Internet Protocol (IP). The IP specification includes an enumeration of fields associated with the IP header which fields contain information about an associated packet including information for determining how the packet should be delivered. The IP header fields will be described in greater detail herein below. For a more complete understanding of the contents of the IP header, see "Internet Protocol Specification", E. J. Postel, SRI International, Menlo Park, Calif., September 1981, RFC791.

For Data Link Layer communications, Point-to-Point-Protocol (PPP) has become a dominant protocol. PPP includes three main components: a method of encapsulating multi-protocol datagrams, a datagram being a unit of transmission in the network layer (such as IP), a link control protocol (LCP) for establishing, configuring and testing the data-link connection, and a family of network control protocols (NCP) for establishing and configuring different network-layer protocols.

PPP is designed to transport packets between two so-called peers, i.e. the two ends of a link conforming to the protocol. Accordingly, the LCP may be used to agree upon the encapsulation format options, handle varying limits on sizes of packets, detect configuration errors, and terminate the link. Other optional facilities are the authentication of the identity of its peer on the link, and the determination when a link is functioning properly and when it is failing. PPP links-provide full-duplex simultaneous bidirectional operation. A definition of PPP may be found in the Networking Group Request for Comments RFC 1661, "The Point to Point Protocol" editor W. Simpson, July 1994.

Communication across a link established using PPP is accomplished such that a datagram associated with a protocol may be encapsulated into one or more frames. A frame, as described above, may include a header and/or a trailer, along with some number of units of data. However, it is conventional that an entire packet is mapped into a frame. Conventional framing breaks down however during conditions of heavy network congestion where fragmentation methods may be used to improve flow control management. Such congestion has arisen due to, among other factors, the increase in traffic caused by increased numbers of greater bandwidth connections provided by, for example, multilink service. Since both basic and primary rate ISDN, for example, allow for multiple simultaneous channels between systems to allow for bandwidth on demand, problems associated with such services must be addressed. Congestion giving rise to latency may be a particular problem for real time data such as voice or video, VoIP, Telnet, and the like. Such real time data formats have little or no tolerance to packet latency, jitter, packet reordering and related problems. Problems associated with the multilink environment only amplify the unique real time packet data requirements.

To ease congestion in the multilink environment, one solution known as Link Fragmentation and Interleaving (LFI) is proposed in the White Paper entitled "Cisco IOS™ Software Quality of Service Solutions", Apr. 8, 1999, by Cisco Systems. In LFI, delay and jitter are reduced by breaking up large datagrams and interleaving time sensitive packets with the resulting packet fragments. LFI is contemplated for relatively low speed links where serialization delay is the predominant delay factor. LFI simply requires that PPP be configured to allow for interleaving. Otherwise, LFI is transparent to PPP.

A similar solution is proposed in Internet Engineering Task Force (IETF), INTERNET-DRAFT, "Multi-Class Extension to Multi-Link PPP", June 1999, expires: December 1999, by Carsten Borman. Here, a fragment oriented solution may be found for the real time encapsulation of format which is part of the standard architecture of, for example, integrated services communications links.

Certain problems associated with conventional LFI, multi-link PPP, and related data transfer may best be illustrated by an example. The transfer of a 1.5 kbyte packet on a 28.8 kbit/s modem link may occupy the link, making it unavailable for data transfer of packets associated with other links in the multi-link environment, for upwards of 400 ms. Such delay may create round trip delays associated with interactive real time data, such as a voice conversation, of close to a second. By fragmenting packets of various priorities larger than a predetermined size high priority packets or fragments thereof may be sent between fragments of lower priority packets. Existing multi-link PPP specifications already provide for fragmentation by providing sequence numbers and begin and end bits in the PPP encapsulation format. However, existing multi-link PPP does not provide for the suspension of transfer of fragments of one packet in order to send another, due to contiguous packet numbering schemes. The solution proposed by Borman, supra, includes running multiple multi-link protocol instances on the same link allowing for nesting of multiple suspendable classes using unused bits in the multi-link PPP protocol to specify class numbers. Accordingly, fragments belonging to a particular class can be sent without the multi-link header and four to twelve levels of suspension may be achieved depending on the number of header bits.

Regardless of the methods of scheduling fragments contemplated, problems arise in implementation. In particular, it should be noted that the lower three protocol layers and associated protocols including, for example, UDP, IP, and PPP, along with the physical layer typically reside on hardware resources, such as routers, which may introduce limitations that are detrimental to the benefits gained from fragmentation and other scheduling methods. In particular, a router, for example, may typically queue outbound packets together in the same transmit queue once priority or the like has been established. The configuration of a typical outbound packet queue is generally First In First Out (FIFO) and has a level of intrinsic delay associated with the queue depth. Further, a router experiencing high traffic levels and using a typical outbound packet queue raises the possibility of packet dropping when congestion occurs, even when using LFI, multi-link PPP or the like. If packets are forced to be dropped from downstream queues after IP scheduling occurs, problems related to packets received out of sequence may occur. Depending on the link configuration, request for retransmission of the missing packets, for example, may cause delay and degradation of real time data.

Packet dropping can be particularly troublesome when used in conjunction with other methods of reducing congestion such as, for example, header compression. By compressing or discarding certain portions of information contained in a typical header, header compression methods reduce the overall size of the datagram or packet. This is particularly important in the case of small packets typically used for real time data transfer applications where the header may represent close to 100% packet overhead. Although, header compression may be performed at various stages, problems arise due to an assumption which must be made in the art when using header compression that packet reordering or resequencing, including the effects of packet dropping, will not occur. Approaches for dealing with this problem adds nearly as much header overhead as was saved originally with header compression techniques. For more general information on header compression see Internet Engineering Task Force (IETF), INTERNET-DRAFT, "Providing Integrated Services Over Low-bitrate Links", June 1999, expires: December 1999, by Carsten Borman, and see also Networking Group Request for Comments RFC 1144, "Compressing TCP/IP Headers for Low-Speed Serial Links", editor V. Jacobson, February 1990.

On slow links, as described, time sensitive packets can not afford to wait for the completion of, for example a long Best Efforts (BE) data packet. Using IP fragmentation may improve latency for such packets, but at a cost of adding a header of around 20 bytes for each segment. Another solution is to use Multi-link PPP segmentation that adds a header of 2 or 4 bytes to each segment. Such headers are designed to propagate scheduling information to the segments or fragments. Header compression, however, makes IP scheduling difficult. When header compression is used, information including the identification field in the IP header becomes unavailable to lower layers after compression. If a HC packet is dropped, the resulting missing sequence number at the receiver will cause problems on the link, as previously described, since the receiver will, for example, request retransmission of the dropped packet and the layer responsible will be unable to identify which packet was dropped and will thus be unable to request the dropped packet from higher layers, introducing further delay and degradation of quality.

Therefore, it would be appreciated in the art for a method and apparatus which handles scheduling and reduces the adverse effects on scheduling imposed by header compression on dropped packets. Such a method and apparatus would operate without disruption of the operation of the IP layer allowing generic IP scheduling on pure IP packets with header compression.

SUMMARY

It is therefore an object of the present invention to provide a method and apparatus for reducing packet delay using scheduling and header compression.

It is a further object of the present invention to provide such a method and apparatus at various layers within a multi-layer protocol implementation.

Therefore, in accordance with one aspect of the present invention, the foregoing and other objects are achieved in a method and apparatus for reducing delay in the transmission of a plurality of packets. The packets may have a plurality of classifications according to a multi-layer protocol having at least a higher layer, and a lower layer. Packets may be scheduled according the associated classifications. If congestion occurs during scheduling, packets which cannot be scheduled may be discarded. After scheduling and discarding some packet headers may be compressed and, accordingly, sequence information may be preserved.

In accordance with another embodiment of the present invention, packets may be queued in a first and a second queue, after scheduling, discarding, and compressing, according to at least two of the plurality of classifications, the first queue having priority over the second queue. For example, one the two possible classifications may include Best Efforts classification such that queuing would include determining whether packets are classified as Best Efforts packet and if so, queuing Best Efforts packets into, for example, the second queue.

It should be understood that a number of classifications may be included which may be associated with, for example, QoS levels as may be found in an IP header associated with a packet. Classifications may also be associated with a plurality of delay factors and it may be preferable to establish a plurality of queues based on the plurality of classifications. Accordingly, each packet may be queued into one of the plurality of queues based on an associated classification.

In accordance with yet another embodiment of the present invention, the plurality of classification may be associated with Link Fragmentation and Interleaving (LFI) as described herein above. Alternatively, the plurality of classifications may be associated with Multilink PPP as also described herein above.

It should further be noted that in accordance with the present invention, scheduling may be performed at the higher or lower layers, wherein the lower layer may include a PPP layer as described above. The lower layer may further include an HDLC layer and when scheduling is performed therein, a tag may be created for each of the packets prior to header compression. The tag may be added thereafter and may be removed prior to transmitting. Each packet from the first and the second queue may be queued in an outbound packet queue having a queue depth of no greater than one.

BRIEF DESCRIPTION OF THE DRAWINGS

The objects and advantages of the invention will be understood by reading the following detailed description in conjunction with the drawings, in which:

FIG. 7A is a diagram illustrating exemplary IP scheduling at the HDLC layer in accordance with the present invention; and FIG. 7B is a diagram illustrating exemplary tag attached to a compressed header at the HDLC layer in accordance with the present invention.

DETAILED DESCRIPTION

Therefore in accordance with the present invention a method and apparatus are provided which allow header compression to be used in conjunction with IP scheduling at various layers in a network node such as a router, line interface card, or the like.

Figure 1:
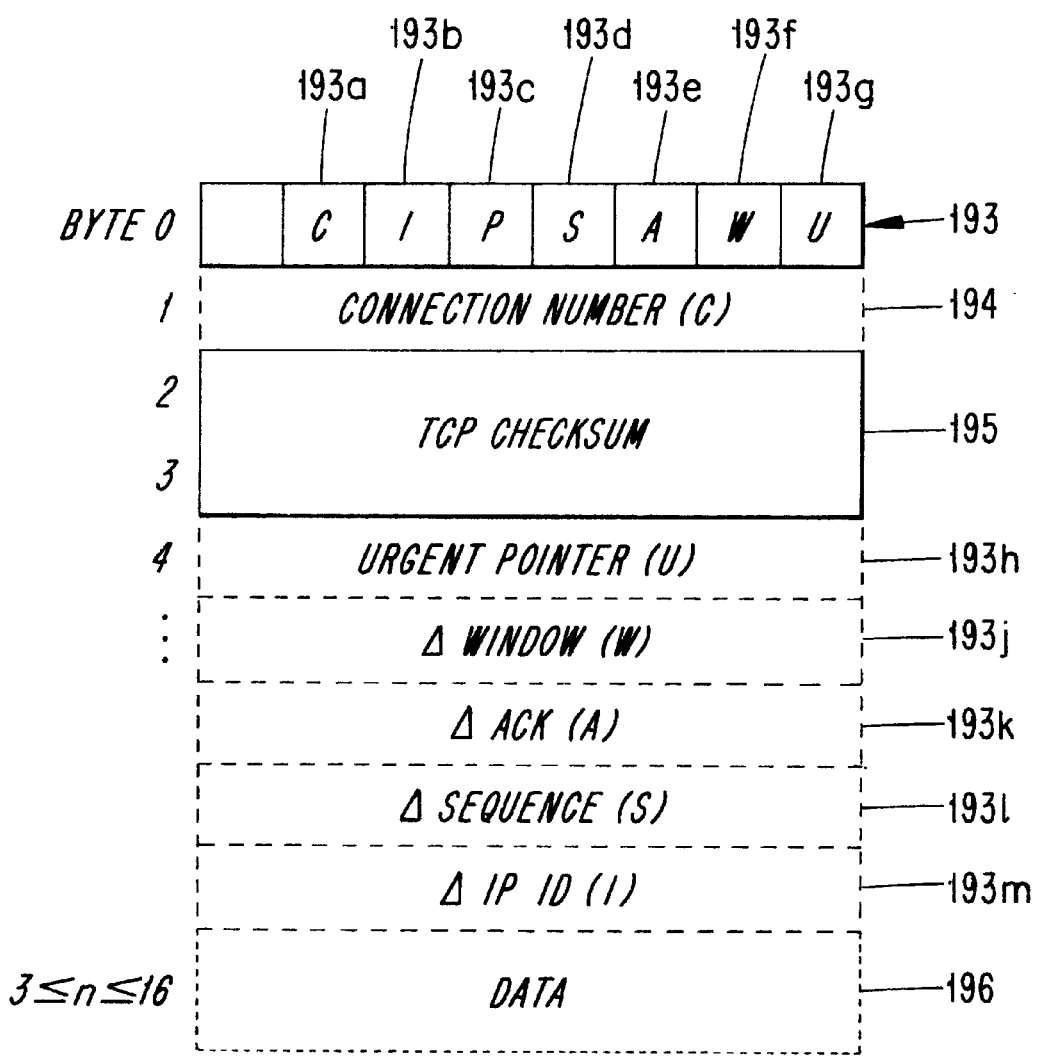
FIG. 1 is a diagram illustrating an exemplary compressed datagram and format using TCP/IP.

It should be noted that in accordance with the present invention, header compression of IP packets may be performed as described herein at various stages according to particular embodiments of the present invention. An exemplary compressed header format is illustrated in FIG. 1 which might result from, for example, a header compression operation on a typical TCP/IP header. As was previously noted, TCP is used herein to exemplify a transport layer protocol although other transport layer protocols, preferably UDP, may also be used in accordance with the present invention. As can be seen, important information may be carried over into the compressed packet and may be interpreted through processing of, for example, change mask 193 which indicates which of the fields expected to change actually change. Bits 193a–193g may be used to indicate these changes as the compressed header format may typically be made up of the fields which are expected to change during the course of a connection or packet session. Connection number field 194 may contain a value which allows a receiver to locate a saved copy of the last packet from the particular connection indicated for the purposes of comparing the previous value of, for example, change mask 193 with its present value. TCP checksum field 195 contains a checksum for the compressed header calculated in a manner known in the art. Urgent pointer 193h contains a value pointing to urgent data. The remaining fields represent changes in the values for the associated fields, for example, Δ window field 193j represents the change in window field and thus may be represented using a smaller value reducing the size of the field from two octets to one. Likewise, Δ ack field 193k, represents the change in acknowledgment number field and uses one octet instead of four. Δ sequence field 193l represents the change in sequence number field and, again, results in a reduction from four octets to one. Δ IP ID field 193m represents the change in Packet ID field from an associated IP header and may result in a reduction in size from two octets to one. Finally data field 196 may follow at the end of compressed header fields as shown. It should be noted that in the case where, for example, no changes are present between packets, fields 193h–193m may be omitted and data field 196 may follow directly behind TCP checksum field 195. It should be noted that the above mentioned fields may be associated with an exemplary IP packet with header compression performed thereon. It may further be possible to reduce the number of fields compressed or to compress an incoming IP packet and simply include a tag in accordance with the teachings of the present invention.

Figure 2:
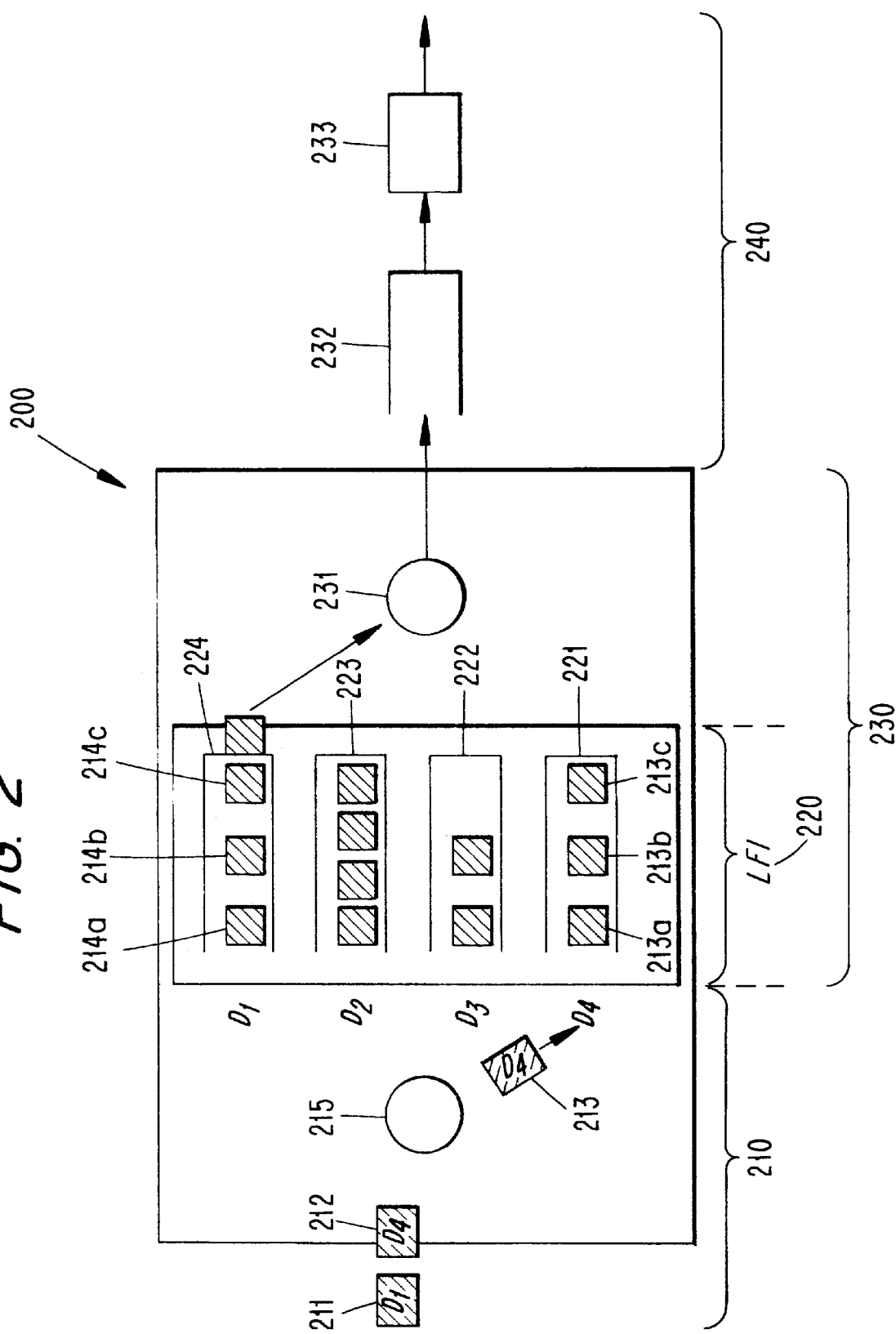
FIG. 2 is a diagram illustrating exemplary Link Fragmentation and Interleaving.

With an understanding of the fundamental nature of multilayer protocols, it is possible to appreciate the problems associated with congestion control in links carrying multiple data types, (e.g real time, Best Efforts, and the like) which may be header compressed. These problems are particularly troublesome at layers below the layer which header compression occurred on especially when packets are scheduled prior to header compression and then discarded due to congestion after compression has been performed. During periods of congestion it is often the case that packets awaiting transfer must be scheduled or queued using several known methods. FIG. 2 illustrates an exemplary network node 200 using a typical network service stack having the lower three layers. Exemplary data packets 211, 212, and 213 are shown entering network layer 210, where process 215 may decide based on the time sensitivity, shown, for example with reference to packet 212 as $D_4$, with $D_1$ indicating the highest time sensitivity and $D_4$ indicating a relatively lower time sensitivity, where to position incoming packets for transfer within queues 221, 222, 223, 224 of Link Fragmentation and Interleaving (LFI) layer 220. It can be seen that LFI layer 220 may occupy at least a portion of data link layer 230. Packets in queue $D_1$ 224 may be sent first, then $D_2$ 223, $D_3$ 222, and $D_4$ 221. Long packets such as represented by packet 213 may be fragmented into smaller packets as represented by packets 213a, 213b, and 213d. As long packets are generally of a lower priority, high priority packets associated more often with real time data such as voice, audio, or video, such as represented by packets 214a, 214b, and 214c may be accumulated prior to transfer in queue 224. As packets enter queues 221–224 they are transferred to the physical layer by process 231 which may be a typical data link process such as HDLC or the like where they can be processed in FIFO transmit queue 232 and output to physical link 233.

Figure 3:
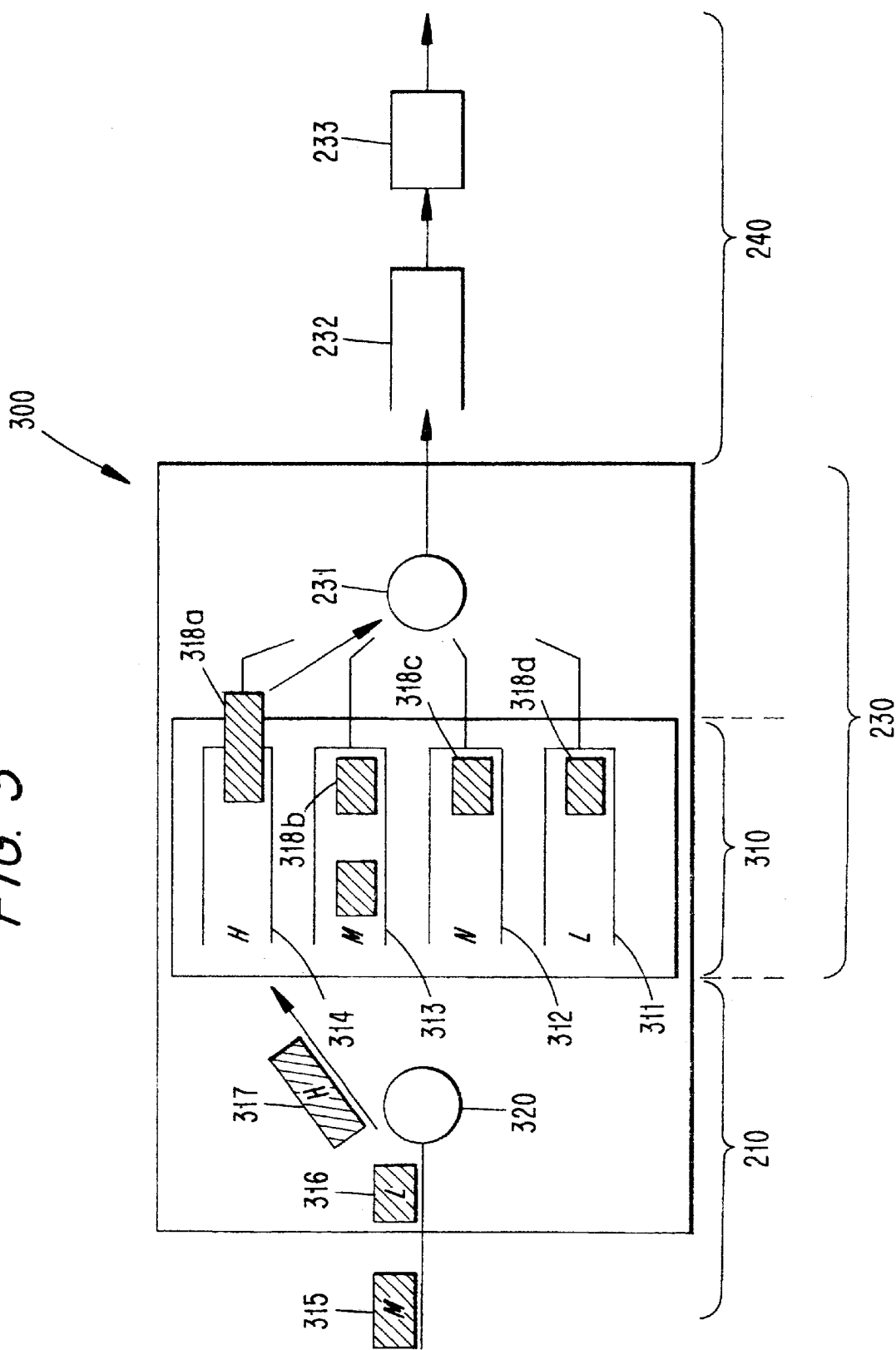
FIG. 3 is a diagram illustrating exemplary priority queuing.

Notwithstanding LFI methods as described above, once packets are fragmented, they may be queued according to, for example, a conventional priority queuing scheme, an example of which is illustrated in FIG. 3, or may be queued according to a suitable derivative thereof. Exemplary network node 300 is shown having a priority queuing implementation with queues 311–314 ranging from Low to High priority respectively. Packets 315, 316, and 317, for example, arrive at network layer 210 with different priorities as may be determined by the contents of, for example, QoS information included with an IP header typically associated with each of packets 315, 316, and 317 respectively. High priority packet 317, for example, may be placed in high priority queue 314 by process 320. Incoming medium priority packet 315 and low priority packet 316 may be placed respectively in medium priority queue 313 and low priority queue 311 by process 320 when arriving at network layer 210. Priority queuing may take place at layer 310 which may be equivalent to data link layer 230 or an alternative protocol layer such as a PPP layer or the like which interfaces with data link layer 230. Outbound packets 318a–318d are sent to process 231 for queuing in transmit queue 232 according to priority with high priority outbound packet 318a being sent first as shown. Outbound packets 318a–318d may then be transferred to the physical layer by process 231 which may be a typical data link process such as HDLC or the like where they can be processed in FIFO transmit queue 232 and output to physical link 233.

Figure 4A:
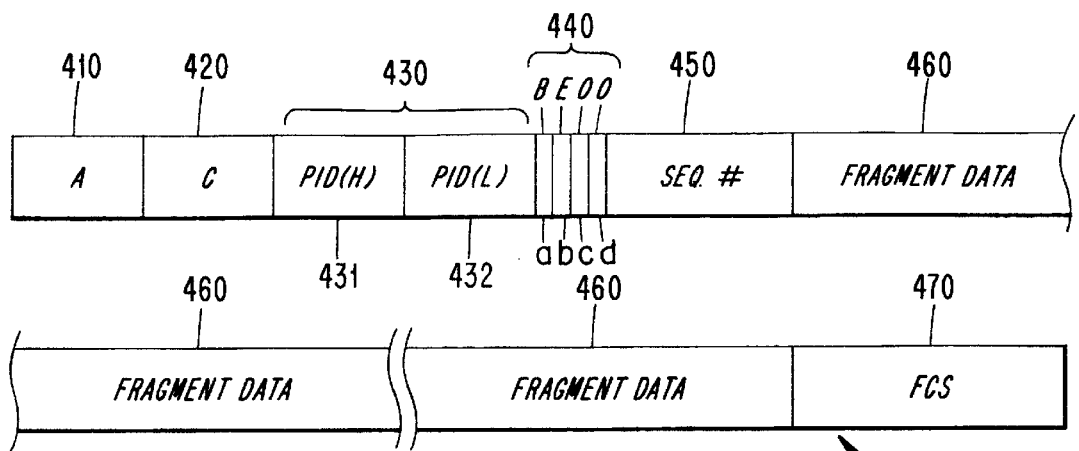
FIG. 4A is a diagram illustrating an exemplary fragmentation format for multilink PPP.

While LFI and priority queuing described in conjunction with FIG. 2 and FIG. 3 may allow for packets to be processed more efficiently, it is important to note that efficient processing relies on accurate header information most often associated with, for example, an IP header for priority queuing and for packets which have been fragmented, sequence information is crucial. At lower layers however, such information may not be as readily available and in the case of compressed IP headers, such information is unavailable until the IP packet is decompressed. Fragmentation at lower layers require additional header information to track fragments peer to peer. It should be noted that in a layered protocol it is possible to have fragmentation at multiple layers, however each layer must track fragmentation and certain data types may not tolerate certain anomalies which are more probable when packets are fragmented such as out of sequence packets and the like. Accordingly, as described in "Multi-Class Extension to Multi-Link PPP", supra, a header format to accommodate multiple classes for queuing priority are described. FIG. 4A illustrates a packet format for basic multilink PPP.

Figure 4B:
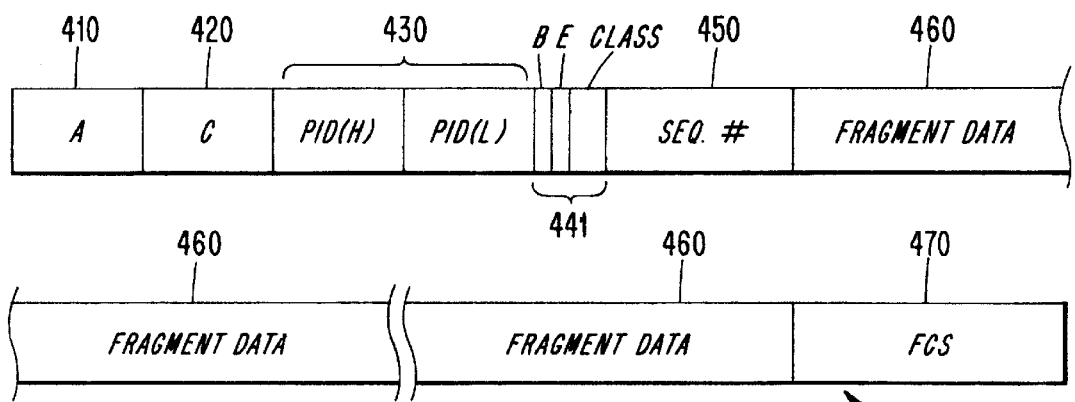
FIG. 4B is a diagram illustrating an exemplary fragmentation format accommodating multiple classes and short sequence numbers for multilink PPP.
Figure 4C:
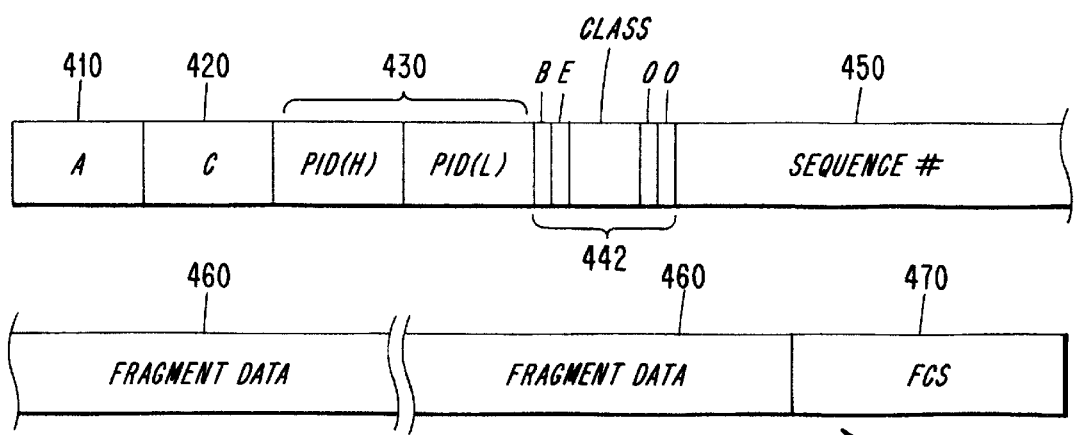
FIG. 4C is a diagram illustrating an exemplary fragmentation format accommodating multiple classes and long sequence numbers for multilink PPP.

Address field A 410 may contain a value representing the address of the packet destination. Control field C 420 may contain a value associated with setting of bits associated various control functions as is known. Packet Identification PID field 430 contains high and low octets 431 and 432 and can support large numbers of fragments. Field 440 contains bits which include Beginning indicator bit 440a which is set to indicate the beginning fragment of a fragmented PPP packet; and Ending indicator bit 440b which is set to indicate the ending fragment of a fragmented PPP packet. All other fragments should have Beginning indicator bit 440a and Ending indicator bit 440b set to zero. It is further possible that both bits are set to one when only one "fragment" is associated with a packet. Bits 440c and 440d may be used to indicate a class level which in the most basic implementation may be zero for single class PPP. It should be noted that the primary difference between the multi-link PPP formats illustrated in FIG. 4A, FIG. 4B, and FIG. 4C is the configuration of respective class fields 440, 441, and 442, which as can be seen support progressively more sophisticated classification for fragments. Accordingly, priority-like queuing may be accomplished at the PPP level using classification values contained in fields 440, 441 and 442. Sequence field 450 may be a 24 bit value (or may be negotiated to 12 bits) which is incremented for every fragment sent. Fragment data segments 460 may follow until FCS segment 470 is reached indicating the end of the fragment data.

Figure 5A:
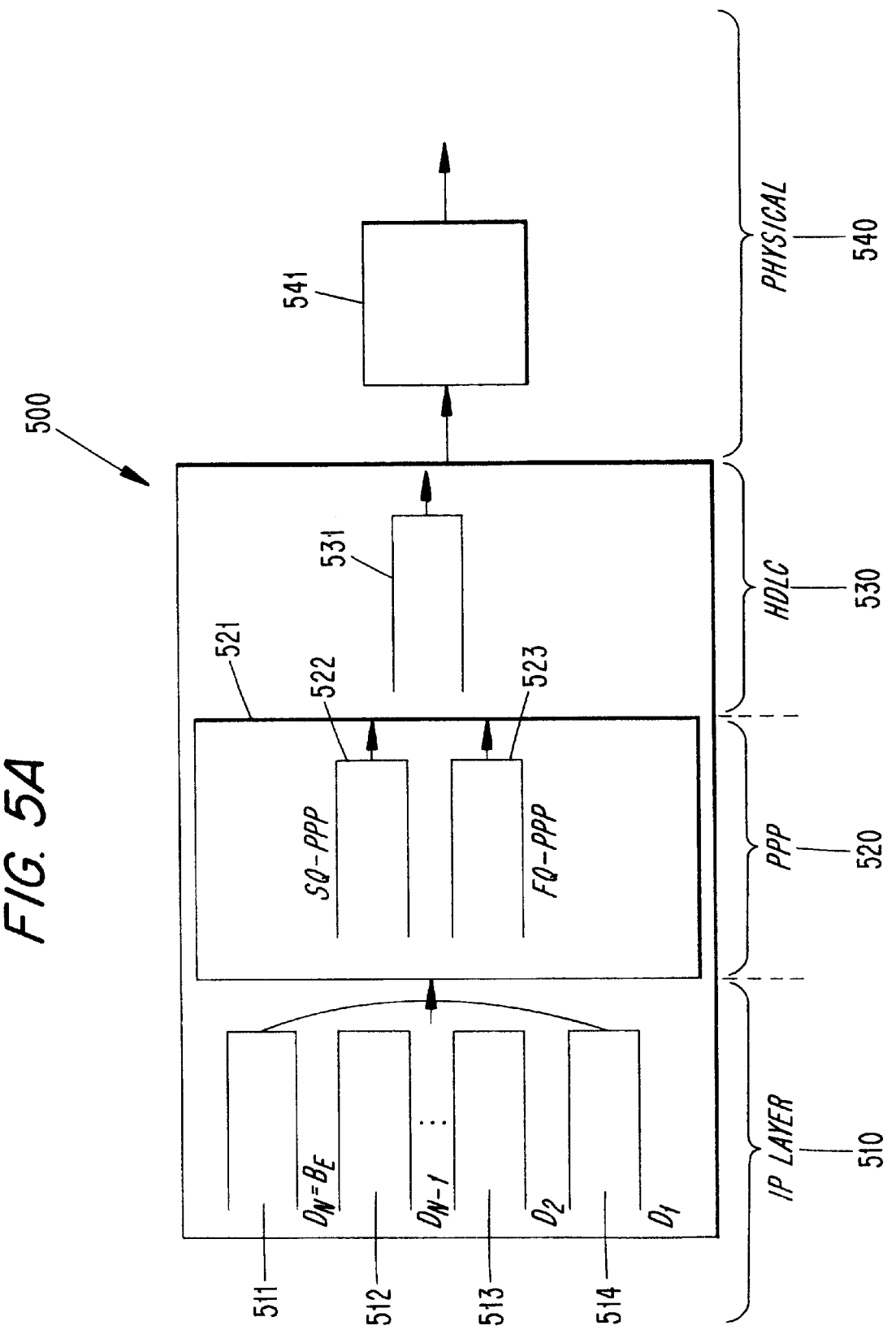
FIG. 5A is a diagram illustrating exemplary pure IP scheduling in accordance with the present invention.

Therefore in accordance with one embodiment of the present invention, as illustrated in FIG. 5A, for example, various QoS levels which may be specified in an IP header of a datagram bound for IP layer 510 may be handled by performing "pure" IP scheduling at IP layer 510. It can be seen that a queuing discipline may be invoked using queues 512–514 for handling time sensitive packets. Lowest time sensitivity queue $D_{N-1}$ 512 my carry packets with the longest delay tolerance. It may be possible for such time sensitivity to be determined, for example, by examining the DS byte or ToS field associated with the typical IP header. Packets with lower QoS requirements, for example, may be relegated to lower priority queues. In contrast, packets with higher levels of QoS, such as real time packets associated with, for example voice data, may be associated with higher levels of time sensitivity and may accordingly be placed in higher priority queues. Packets with progressively greater degrees of time sensitivity may be scheduled in progressively higher priority queues with the highest sensitivity packets being scheduled to high time sensitivity queue $D_1$ 514. Packets having QoS set to Best Efforts, which are usually packets associated with non-real time data may be placed in Best Efforts queue $D_N$ 511, which as the name suggests, are sent when possible, for example, during intervals when there are no higher priority packets to be sent. It should be noted that interleaving and fragmentation may be used in conjunction with the time sensitive and Best Efforts queuing strategies as described. Processing in the pure IP scheduling embodiment will be described in greater detail hereinafter.

Figure 6:
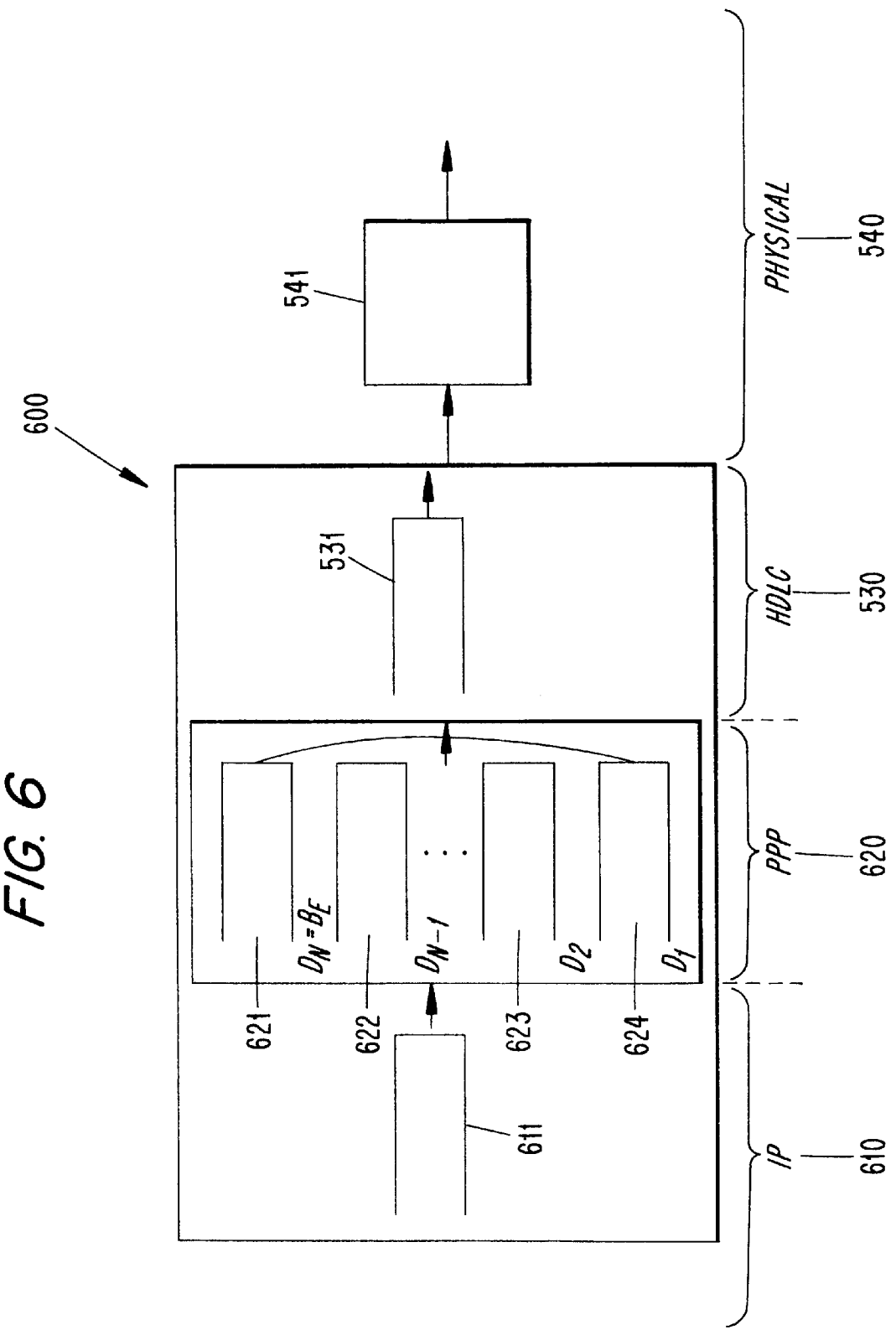
FIG. 6 is a diagram illustrating exemplary IP scheduling at the PPP layer in accordance with the present invention.

It is further possible in another exemplary embodiment of the present invention to include scheduling at the PPP layer as is illustrated in FIG. 6 because of the reduction from two step scheduler to a one step scheduler. PPP layer 620 may be provided with a series of priority queues 621–624 representing varying degrees of time sensitivity from highest time sensitivity queue $D_1$ 624 to lower time sensitivity queue $D_{N-1}$ 622, to Best Efforts queue $D_N$ 621.

It is important to note that in each of the exemplary embodiments as described herein above, output processing must be performed including IP forwarding; Packet Identification (DS byte lookup); Packet Scheduling including packet discarding, rate control, and priority queuing; Header Compression; Link Adaptation including PPP/MP, Ethernet, ATM; and Link Framing. IP forwarding and Identification must be done before Header Compression. It is further important to note that packet discarding must take place before HC, since, as described, a dropped packet in a header compressed sequence will cause out of sequence related problems. In a backpressure environment in accordance with the present invention, it is important that the outbound packet queue be set for a depth of no more than 1 to ensure that time sensitive packets will have to wait for, at most, one best effort packet before being processed in the outbound packet queue. If packet scheduling is done after HC, the HC function may have to add a "local" tag on top of the packet, to tell the link layer what queue the packet should be put into.

In the "pure" IP scheduling embodiment as illustrated in FIG. 5A, pure IP packets are scheduled (e.g. full IP header and payload). Discarding packets will occur if the queues associated with IP layer 510 are full, or upon other common principles as may be known and practiced in the art.

Before being transmitted on the physical line, a link layer adaptation is performed on an outgoing packet. In accordance with an embodiment performing scheduling at IP layer 510, HC and PPP/MP/HDLC framing may be performed to accomplish link layer adaptation. To shorten delay for time sensitive packets, such as voice packets, regardless of number of classes imposed by, for example, a fragmentation and interleaving scheme which may be used in accordance with the previous description, a simple priority queuing discipline may be used at PPP layer 520, using, for example, two queues, queue SQ_PPP 522 and queue FQ_PPP 523. If the degree of segmentation includes more than Best Efforts QoS or has additional classes as outlined in conjunction with multi-class PPP as described above, additional queues for each additional class to be segmented may be added at PPP layer 520. Accordingly, information related to when a packet can be transmitted must be known to the scheduling process, or in the present embodiment, PPP layer 520.

Packets classified by, for example, analyzing the DS or QoS field as described above, or by analyzing the class associated with the packet as outlined in reference to the description of FIG. 4A–4C, and grouped into delay levels associated, for example, with queues $D_1$ 514 to $D_{N-1}$ 512 from IP layer 510 may be placed in queue FQ_PPP 523, and will be sent before the rest of the segments belonging to, for example, a large BE packet. It should be noted that Header Compression may preferably be performed before packets are scheduled in queue FQ_PPP 523. BE packets and segmented packets may be put in queue SQ_PPP 522. If packets too large, MP processing in PPP layer 520 may perform segmentation before queuing.

At HDLC layer 530, which may be a data link layer adjunct to PPP layer 520, packets may be header compressed and scheduled in accordance with the foregoing description. To further facilitate post header compression processing of packets, the depth of output buffer 531 which may be found on, for example, an interface card is set to not more than one packet. This provides "backpressure" in that any discarding of packets due to congestion will be forced to take place above queues FQ_PPP 523 and SQ_PPP 522 and, thus, upstream of header compression. Such a result is desirable since, as described, packets which are discarded after header compression, may cause out of sequence related problems.

The operation of the exemplary embodiment illustrated in FIG. 5A may best be understood according to the following pseudo code associated with an exemplary queuing discipline for queues FQ_PPP 523 and SQ_PPP 522. An exemplary output loop in a scheduler which may reside at the interface between IP layer 510 and PPP layer 520 may be allowed to schedule packets to queues FQ_PPP 523 and SQ_PPP 522 when, for example, any of the following cases are true:

case 1) Packets in queue $D_1$ 514, AND FQ_PPP 523 not full.

case 2) (case 1 is FALSE) AND (packets in $D_2$ 513) AND (FQ_PPP 523 is empty).

case N–1) (case 1, 2, . . . , N–2 are FALSE) AND (packets in $D_{N-1}$ 512) AND (FQ_PPP 523 is empty)

case N) (1, . . . , N–1 are FALSE) AND (packets in $D_N$ 511) AND (SQ_PPP 522 not full)

It should further be noted that in accordance with an embodiment of the present invention packets in queue FQ_PPP 523 are preferably always transmitted before packets in queue SQ_PPP 522.

Figure 5B:
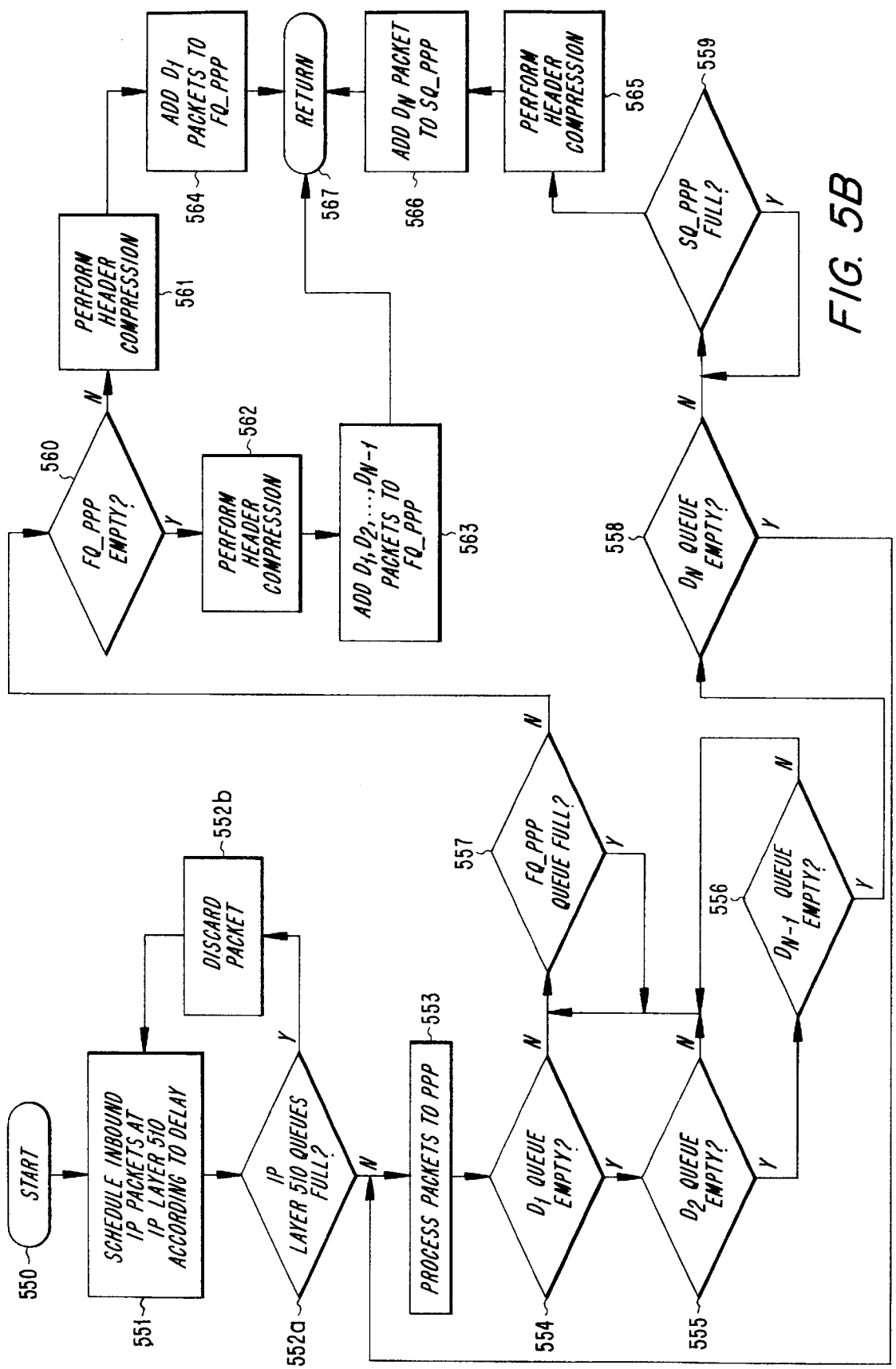
FIG. 5B is a flowchart illustrating exemplary pure IP scheduling in accordance with the present invention.

An exemplary flowchart, as illustrated in FIG. 5B, may best show how packets may proceed through, for example, a software process in accordance with the present invention. Packets received at starting point 550, for example, IP layer 510, from higher layers in a sender implementing a multi-layer protocol may be scheduled in queues 511–514 according to the delay factor associated with the packet in block 551. Because of the "backpressure" design for output queue 531, decision block 552a may be implemented to discard packets in block 552a prior to PPP layer 520 queuing and header compression. If IP layer 510 queues 511–514 become full the associated packets may be discarded and arrangements for rescheduling may be pushed up to higher layers. Otherwise, packets from queues 511–514 may be processed in PPP layer 520 for queuing according to the process as outlined above. Packets are processed with the most time critical packets being sent to PPP layer 520 queues first. Accordingly, for example, if queue $D_1$ 514 is not empty as determined in decision block 554, and FQ_PPP queue 523 is not full as determined in decision block 557, $D_1$ packets may be added to FQ_PPP 523 whether empty or not as indicated by decision block 560. In either case, header compression may be performed at blocks 562 and 564, before packets are added to queue FQ_PPP 523. For $D_2$ packets, decision block 555 indicates that while packets remain in queue $D_2$ 513, and FQ_PPP 523 is empty as indicated by decision blocks 557 and 560, $D_2$ packets may be header compressed at block 562 and added to queue FQ_PPP 563. In a similar manner, $D_{N-1}$ packets may be added to queue FQ_PPP 523 after being header compressed in block 562 if the conditions of decision block 556, 557, and 560 are satisfied. It should be noted that after time sensitive packets are processed, best efforts packets as represented, for example, by $D_N$ packets, may be added to SQ_PPP 522 in block 566 after traversing decision blocks 558, 559, and being header compressed in block 565.

It should further be noted that the by traversing decision blocks 554, 555, 556, and 558 according to Yes conditions, a loop is formed. Such a loop may represent that, for example, in a software embodiment, a continuous looping may be performed to clear each queue with queue $D_1$ 514 taking priority over the queues below. Moreover, looping may be interrupted should higher priority packets be available for processing before lower priority queues are cleared.

In addition to performing scheduling according to the foregoing descriptions, an exemplary embodiment of the present invention may further perform additional steps prior to queuing in queues FQ_PPP 523 and SQ_PPP 522. For example, after a queue is selected for packet scheduling, header compression may be performed, for example, in accordance with the description provided for FIG. 1, or in a similar manner. In accordance with layered architecture and concepts related to encapsulation as previously described, a PPP header may be added to ensure proper delivery to and decoding by, for example, a PPP peer layer corresponding to PPP layer 520 on a receiving node. As also described, additional degrees of segmentation may be performed on either complete but long BE data packets or packet fragmented at higher layers which are nonetheless too long for efficient transfer at PPP layer 520. Such fragmentation may be performed, for example, using MP.

It should be noted that PPP layer 520 may transfer packets to, HDLC layer 530, embodied in, for example, an interface card when its buffer depth is not more then a single packet. Ideally, optimum delay characteristics on the most time sensitive packets, for example, packets from the queue $D_1$ 514, are arrived at when limit on output buffer 531 is set to zero. However, limiting the depth in such a fashion results in packets not being sent back-to-back. A depth limit for output buffer 531 of one, on the other hand, results in a worst case waiting time, for example, for a packet from queue $D_1$ 514, approximately equal to the transmitting time of almost two BE packets or packet fragments.

It may further be desirable in accordance with the exemplary embodiment to generate an interrupt from HDLC layer 530 when buffer 531 is empty or otherwise ready to be filled with a new packet. Timing for such an interrupt would preferably be optimized to control exactly when queues FQ_PPP 523 and SQ_PPP 522 may send a packet to output buffer 531 reducing worst case packet latency to around one packet transfer interval. Although such timing may be set in, for example, a software routine, a hardware implementation according to known practices in the art may be preferable.

As previously described, discarding a HC packet will result in a missing sequence number at the receiver, resulting in the necessity that a full header be re-transmitted. To prevent the delays and possible disruption of real time data streams such as voice or the like, discarding should preferably be done prior to header compression. In another exemplary embodiment of the present invention as illustrated in FIG. 6, scheduling may be performed at PPP layer 620. Incoming packets at IP layer 610 may be may be analyzed for priority or classification levels. PPP layer 620 may check the depth of the queue associated with a particulary priority or classification prior to scheduling. If the queue associated with the priority or classification of the packet is full, the packet may be discarded by the scheduling process at PPP layer 620. If the queue associated with the priority or classification is not full header compression may be performed, a PPP header added, and further segmentation may be performed using MP, as described, if needed, before queuing the packet.

In yet another exemplary embodiment of the present invention HDLC scheduling may be performed at, for example, HDLC layer 720 as illustrated in FIG. 7A to reduce maximum waiting time for a high priority packet. HDLC layer 720, as in PPP layer 620, and IP layer 510 of previous embodiments, may be provided with a series of priority queues 721–724 representing varying degrees of time sensitivity from highest time sensitivity queue $D_1$ 724 to lower time sensitivity queue $D_{N-1}$ 722, to Best Efforts queue $D_N$ 721.

As in previous embodiments, output buffer 730 is set to a depth of one packet. For queuing and dequeuing, a similar method as for PPP layer 620 previously described with reference to FIG. 6 may be used. The embodiment may not be considered a "pure" IP scheduler, complexity may be reduced by changing a two-step scheduling process to one step. By scheduling after MP, MP extensions may easily be added.

For scheduling at HDLC layer 720, generating an interrupt from output buffer 730 to improve packet latency for time sensitive packets, for example, voice packets while maintaining full link utilization may not be the optimum solution since scheduling may now be performed, for example, on an interface card. Instead of one buffer at HDLC layer 720 there will be buffers 721 through 724 using, for example, a scheduling algorithm similar to that used for scheduling at the PPP layer 620 previously described with reference to FIG. 6. Accordingly, no back pressure and no scheduling at IP layer 610 and PPP layer 710 is needed. To handle discarding, it may be preferable to implement signaling between a discarding process and a scheduling process at HDLC layer 720. It should be noted again that a problem occurs when header compression is performed on IP packets, due to classification information contained, for example, in the DS byte, being unavailable after compression.

Accordingly, in the present embodiment as illustrated in FIG. 7B, a local byte or "tag" 752 may be added on top of packet 751, preferably now header compressed, by the scheduling process at HDLC layer 720. Tag 752 may contain information which is redundant to the information contained in the header and is created prior to compression. Tag 752 may be removed before packet 751 is queued for transmission. Discarding of packets may be performed separately from the rate control at a point before header compression. Rate control may be performed within the scheduling process at HDLC layer 720. The decision as to whether a packet should be discarded or not may preferably be based on a check performed after receiving an IP packet from, for example, buffer 611 in PPP layer 710. If the corresponding one of queues 721–724 the packet is destined for is full, the packet will be dropped, else it will be proceed to header compression.

Thus, to summarize the functions of the respective layers in the present embodiment, IP layer 610 may perform discarding of packets prior to header compression. Each packet may have a short "tag" created prior to header compression which tag may contain information previously contained in the header and may be added to header compressed packets. PPP layer 710 may perform segmentation on long data packets using, for example, MP. HDLC layer 720 may perform scheduling included in, for example, a software device driver or alternatively HDLC layer 720 may be embodied in hardware where tag 752 may be added. Tag 752 may be removed before packet 751 is transmitted.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method of reducing delay in the transmission of a plurality of data packets on a communication link, said packets having a plurality of associated priority classifications, and being transmitted according to a multilayer protocol having at least a first layer and a second layer, the method comprising the steps of:

scheduling each of the plurality of packets for transmission by placing each packet in one of a plurality of queues at the first layer, each of said first-layer queues corresponding to a different one of the plurality of priority classifications associated with the data packets;

discarding any of the plurality of packets that cannot be placed in one of the first-layer queues;

determining whether a queue having the highest priority in the second layer has sufficient space available for the packets in the highest priority first-layer queue to be moved to the highest priority second-layer queue;

if the packets in the highest priority first-layer queue cannot be moved to the highest priority second-layer queue, retaining the packets in the highest priority first-layer queue until the packets can be moved to the highest priority second-layer queue; and if the packets in the highest priority first-layer queue can be moved to the highest priority second-layer queue:
compressing a header on each of the packets in the highest priority first-layer queue;
moving the packets in the highest priority first-layer queue to the highest priority second-layer queue; and
transmitting the packets from the highest priority second-layer queue through an output buffer to the communication link.

2. The method of claim 1, wherein the plurality of classifications are associated with Quality of Service (QoS) levels.

3. The method of claim 1, wherein the plurality of classifications are associated with a plurality of delay factors; wherein each of the plurality of delay factors is different in each of the plurality of queues.

4. The method of claim 1, wherein the plurality of classifications are associated with a plurality of drop sensitivity factors; wherein each of the plurality of drop sensitivity factors is different in each of the plurality of queues.

5. The method of claim 1, wherein the plurality of classification are associated with Link Fragmentation and Interleaving (LFI).

6. The method of claim 1, wherein the plurality of classifications are associated with Multilink Point-to-Point Protocol (PPP).

7. The method of claim 1, wherein the step of transmitting the packets through an output buffer to the communications link includes transmitting the packets through an output buffer with a depth of one packet.

8. The method of claim 1, wherein the first and second layers each include a plurality of queues from the highest priority queue to a lowest priority queue, and the method further comprises the steps of:

determining in descending order of priority, whether there are packets in any of the first-layer queues;

if there are packets in any of the first-layer queues other than the lowest priority first-layer queue, determining whether the highest priority second-layer queue has sufficient space available for the packets in all of the first-layer queues other than the lowest priority first-layer queue to be moved to the highest priority second-layer queue;

if the highest priority second-layer queue does not have sufficient space available for the packets in all of the first-layer queues other than the lowest priority first-layer queue, determining whether the highest priority second-layer queue has sufficient space available for the packets in the highest priority first-layer queue to be moved to the highest priority second-layer queue;

if the highest priority second-layer queue has sufficient space available for the packets in the highest priority first-layer queue to be moved to the highest priority second-layer queue, repeating the compressing, moving, and transmitting steps;

if the highest priority second-layer queue has sufficient space available for the packets in all of the first-layer queues other than the lowest priority first-layer queue:
compressing a header on each of the packets in all of the first-layer queues other than the lowest priority first-layer queue;
moving the packets in all of the first-layer queues other than the lowest priority first-layer queue to the highest priority second-layer queue; and
transmitting the packets from the highest priority second-layer queue through an output buffer to the communication link.

9. The method of claim 8, wherein the second layer includes a Point-to-Point Protocol (PPP) layer.

10. The method of claim 8, wherein the second layer includes a High-Level Data Link Control (HDLC) layer and the method further comprises the steps of:

creating a tag for each of the plurality of packets prior to performing the step of compressing, wherein the tag contains at least some information from the header;

adding the tag to each of the plurality of packets; and removing the tag prior to the transmission of the each of the plurality of packets.

11. The method of claim 8, further comprising, upon determining that there are no packets in any of the first-layer queues other than the lowest priority first-layer queue, the steps of:

determining whether there are packets in the lowest-priority first-layer queue;

if there are packets in the lowest priority first-layer queue, determining whether the lowest priority second-layer queue is full;

if the lowest priority second-layer queue is full, retaining the packets in the lowest priority first-layer queue until the lowest priority second-layer queue is not full;

if the lowest priority second-layer queue is not full:
compressing a header on each of the packets in the lowest-priority first-layer queue;
moving the packets in the lowest priority first-layer queue to the lowest priority second-layer queue; and
transmitting the packets from the lowest priority second-layer queue through an output buffer to the communication link.

12. The method of claim 11, wherein the lowest priority first-layer queue is associated with a Best Efforts classification, and wherein the step of scheduling includes the steps of:

determining whether each of the plurality of packets is classified as a Best Efforts packet; and queuing the determined Best Efforts packet into the lowest priority first-layer queue.

13. An apparatus for reducing delay in the transmission of a plurality of data packets on a communication link, said packets having a plurality of associated priority classifications, said apparatus comprising:

a plurality of prioritized queues at a first layer of the apparatus, each queue having a priority corresponding to one of the plurality of priority classifications, said priorities ranging from a highest priority queue to a lowest priority queue;

a high priority queue and a low priority queue at a second layer of the apparatus;

a scheduling function that places each of the plurality of data packets in a first-layer queue having a priority that corresponds to the priority classification of the packet;

a discarding function that discards any of the plurality of packets that cannot be placed in one of the first-layer queues;

a packet moving and compressing function that determines whether the high priority second-layer queue has sufficient space available for the packets in the highest priority first-layer queue to be moved to the high priority second-layer queue, and if so, compresses a header on each of the packets in the highest priority first-layer queue, and moves the packets in the highest priority first-layer queue to the high priority second-layer queue;

an output buffer between the communication link and the second-layer queues; and a transmission function that transmits the packets from the high priority second-layer queue through the output buffer to the communication link.

14. The apparatus of claim 13, wherein the plurality of classifications are associated with different Quality of Service (QoS) levels.

15. The apparatus of claim 13, wherein the plurality of classifications are associated with a plurality of delay factors; wherein each of the plurality of delay factors is different in each of the plurality of queues.

16. The apparatus of claim 13, wherein the plurality of classifications are associated with a plurality of drop sensitivity factors; wherein each of the plurality of drop sensitivity factors is different in each of the plurality of queues.

17. The apparatus of claim 13, wherein the plurality of classification are associated with Link Fragmentation and Interleaving (LFI).

18. The apparatus of claim 13, wherein the plurality of classifications are associated with Multilink Point-to-Point Protocol (PPP).

19. The apparatus of claim 13, wherein the lowest priority first-layer queue is associated with a Best Efforts classification and wherein the scheduling function is further configured to:

determine whether each of the plurality of packets is classified as a Best Efforts packet; and queue the determined Best Efforts packet into the lowest priority first-layer queue.

20. The apparatus of claim 19, wherein the packet moving and compressing function is further configured to move Best Efforts packets only from the lowest priority first-layer queue to the low priority second-layer queue.

21. The apparatus of claim 13, wherein the second layer includes a Point-to-Point Protocol (PPP) layer.

22. The apparatus of claim 13, wherein the second layer includes a High-Level Data Link Control (HDLC) layer and wherein the packet moving and compressing function is further configured to:

create a tag for each of the plurality of packets prior to performing the step of compressing, wherein the tag contains at least some information from the header;

add the tag to each of the plurality of packets; and remove the tag prior to the transmission of the each of the plurality of packets.

23. The apparatus of claim 13, wherein the output buffer has a depth of one packet.

\* \* \* \* \*